United States Patent [19]

Garnier et al.

[11] 4,080,025
[45] Mar. 21, 1978

[54] AUTOMATIC CONNECTOR FOR UNDERWATER CONNECTION

[75] Inventors: Jacques Garnier, Le Chesnay; Robert Bailly, Aubergenville, both of France

[73] Assignee: MATRA, Paris, France

[21] Appl. No.: 792,499

[22] Filed: May 2, 1977

[30] Foreign Application Priority Data

May 3, 1976 France .................. 76 13186

[51] Int. Cl.² ............................... H01R 3/04
[52] U.S. Cl. .................... 339/16 R; 166/0.6; 251/149.5; 285/27; 339/42; 339/91 R
[58] Field of Search ................ 339/16 R, 42, 91 R; 251/149.5; 166/0.6; 285/18, 27

[56] References Cited

U.S. PATENT DOCUMENTS

| | | | |
|---|---|---|---|
| 2,350,681 | 6/1944 | Heywood | 251/149.5 |
| 2,819,912 | 1/1958 | Mitchell | 251/149.5 X |
| 3,324,943 | 6/1967 | Price | 166/0.6 |
| 3,339,632 | 9/1967 | Lewis | 339/16 R X |
| 3,673,541 | 6/1972 | Volinskie | 339/16 R |
| 3,675,713 | 7/1972 | Watkins | 285/18 X |
| 3,729,699 | 4/1973 | Briggs et al. | 339/42 |
| 3,839,608 | 10/1974 | DeVries | 339/42 X |
| 3,946,805 | 3/1976 | Peterman | 285/27 X |

*Primary Examiner*—Roy Lake
*Assistant Examiner*—DeWalden W. Jones
*Attorney, Agent, or Firm*—Larson, Taylor and Hinds

[57] ABSTRACT

A connector for underwater use comprises a male part carried by a pod and a female part carried by a sub-sea platform, associated for instance with a well head. The female part comprises a bearing member and a watertight bush which can be moved between a retracted position and an extended position for protecting connecting elements. A plunger comprising lateral connecting elements is similarly movable between two positions in the male part and is protected against sea water when retracted.

5 Claims, 6 Drawing Figures

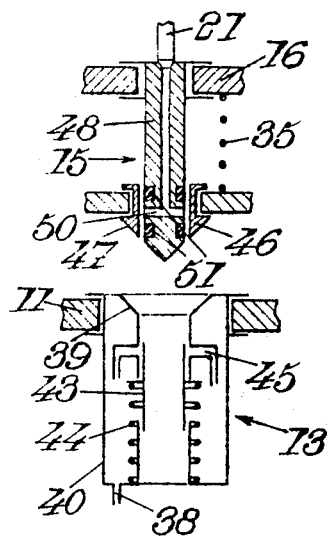
Fig.3.
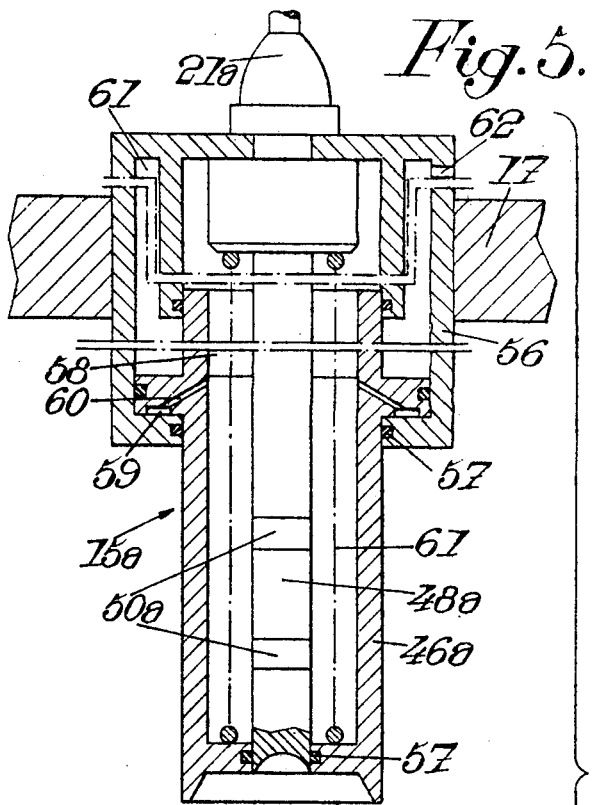
Fig.5.
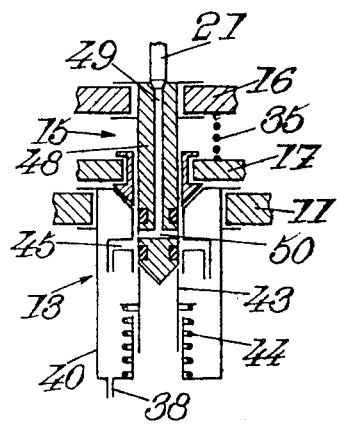
Fig.4.
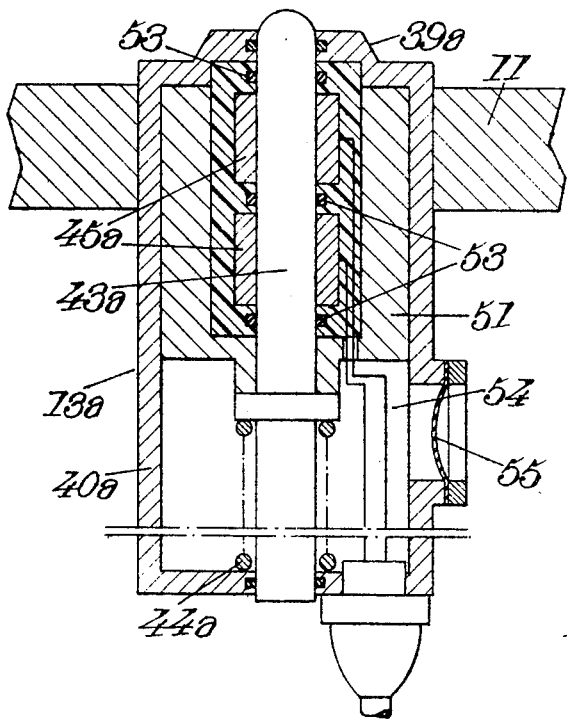

AUTOMATIC CONNECTOR FOR UNDERWATER CONNECTION

BACKGROUND AND SUMMARY OF THE INVENTION

The invention relates to underwater connectors particularly useful for making up and breaking electrical and/or fluid connections while under water, inter alia at great depths and without attendance by divers.

During recent years, oil wells have been drilled and operated from the bottom of the sea at depths far below those where divers can operate. However, control or monitoring electric circuits and hydraulic circuits have to be provided between a surface vessel or platform and a stationary structure permanently disposed on the bottom, such as an oil well. The cables, ducts and control units carried by the stationary structure have to be periodically connected and disconnected, for instance due to emergency conditions or when the surface vessel has to move to another place.

To solve this problem, remote-control or master-slave manipulators have been used. However, conventional manipulators mounted on submarines or remote-control robots cannot perform some of the operations that divers frequently carry out when the depth does not exceed 100° meters. Beyond that depth, a module or pod suspended from a cable should be used; it should be designed for automatic connection and locking to the stationary structure, the pod carrying one half of the or each connector whereas the other half is borne by the stationary structure.

Such connectors should fulfil stringent requirements, particularly if used in tropical waters. Exposure of the contact elements to sea water results in corrosion and fouling, so that the elements rapidly become defective in operation if exposed to water. In the case of multiple electric connectors, the presence of sea water in the connector results in short-circuits or, at least, in electric leaks. Various attempts to overcome these difficulties have already been tried, inter alia by isolating the connecting elements from sea water by an oil body occupying a chamber closed by a diaphragm which is torn or perforated during coupling. In practice, however, this method can be applied only to that part of the connector which is connected to the ship and can be lifted back to the ship in order to replace the oil and diaphragm after each uncoupling operaton. It has also been proposed to protect the contact regions with a thick layer of elastomer which, during coupling, is perforated by the contact elements, which are given a suitable shape. However, after a few coupling and uncoupling operations, the elastomer ceases to operate properly. In some electrical connectors (U.S. Pat. No. 3,729,699), the electrical contacts of the female part are protected against water by a dummy piston until contact occurs. On the other hand, the contacts of the male part are immersed until connection has occured and are consequently subject to corrosion and fouling. A number of other prior art connectors have been designed and disclosed for fluid lines (see for instance U.S. Pat. Nos. 2,819,912, 2,350,681, 3,324,943 and 3,675,713 and French Pat. Nos. 1,184,169 and 1,349,497) and/or electric lines (see for instance U.S. Pat. Nos. 3,946,805, 3,839,608 and 3.339,632) but in none of them the connecting surfaces or contact are completely protected.

It is an object of the invention to provide an improved connector for underwater use which overcomes the above as well as other environmental problems. It is another object to provide a connector whose connecting elements are kept out of contact with water except during coupling and uncoupling and which may be remotely and automatically operated.

To this end, there is provided a connector comprising a female part and a male part, the female part being carried by a stationary structure and the male part being carried by a module or pod which can be moved by moving means towards and from the stationary structure in an engagement direction, typically vertically, wherein:

the female part comprises a bearing member provided with at least one passage parallel to the engagement direction, a bearing end portion and at least one female connecting element in said passage, terminating in a bearing portion; and a sealing bush rectilinearly movable along said passage in the bearing member, between a retracted position and an advanced position towards which it is urged by a return spring and in which it covers the connecting element;

the male part comprises a bearing member likewise formed with at least one passage parallel to the engagement direction, the end part of the bearing member being adapted to be applied in substantially sealing-tight manner against the previously-mentioned bearing portion and to centre the two parts relative to one another and has a plunger reciprocably received in said passage, and the side wall of which is provided with at least one connecting element for cooperating with the connecting elements of the female part, the bearing component of the male part being movable with respect to the plunger between an advanced position, towards which it is urged by a spring and in which it bounds a chamber filled with a hydraulic fluid protecting the connecting elements, and a retracted position in which the contact elements project from the bearing member; and the moving means are adapted to move the bearing member of the female part and the plunger of the male part towards one another by compressing the return springs until the connection is made, and then to hold the male and female parts in connected condition.

In the case of an electric connector, the bush typically is a second plunger of electrically insulating material and having a diameter equal to that of the plunger of the male part, the second plunger being slidably mounted in the bearing component of the female part, and the connecting elements of the second plunger comprising annular electric contacts connected to a water-tight output connection of the male part of the connector.

The bearing member of the male part may be slidably mounted in a cylinder secured to a plate which also bears the plunger of the male part and, in cooperation with the cylinder, bounds an inner chamber in which the male connecting elements are immersed when the bearing member is in the extended position, the bearing member also being slidable in an annular outer chamber communicating with the inner chamber, the variations in volume of the outer chamber compensating those of the inner chamber when the bearing member moves in the cylinder.

In a fluid connector, the junction component of the female part typically is a channel opening radially into the passage via a mouth which is covered by the bush when the latter is in the retracted position, whereas the plunger of the male part has a duct which opens on to the side wall of the plunger via a mouth which, after coupling, is opposite the mouth of the channel of the associated member of the stationary part, the mouths being straddled by seals.

A plurality of connectors for hydraulic fluid and electric connectors can be associated with a platform and pod. One part of each connector will be borne by the stationary platform and the other part by the module or pod suspended from a cable and provided with guidance and approach means. The connector is coupled by lowering the pod towards the platform after positioning the pod over the stationary platform.

The invention will be better understood from the following description of embodiments thereof, given by way of non-limitative examples.

SHORT DESCRIPTION OF THE DRAWINGS

In the drawings:

FIGS. 3 and 4 are diagrams showing successive steps in the coupling of the module and of the stationary structure in FIG. 1; and FIGS. 5 and 6 are diagrams, in section along a vertical plane, showing the main components of the male and female parts of an electric connector during approach (FIG. 5) and after coupling (FIG. 6).

DETAILED DESCRIPTION OF PREFERRED EMBODIMENTS

Figure 1:
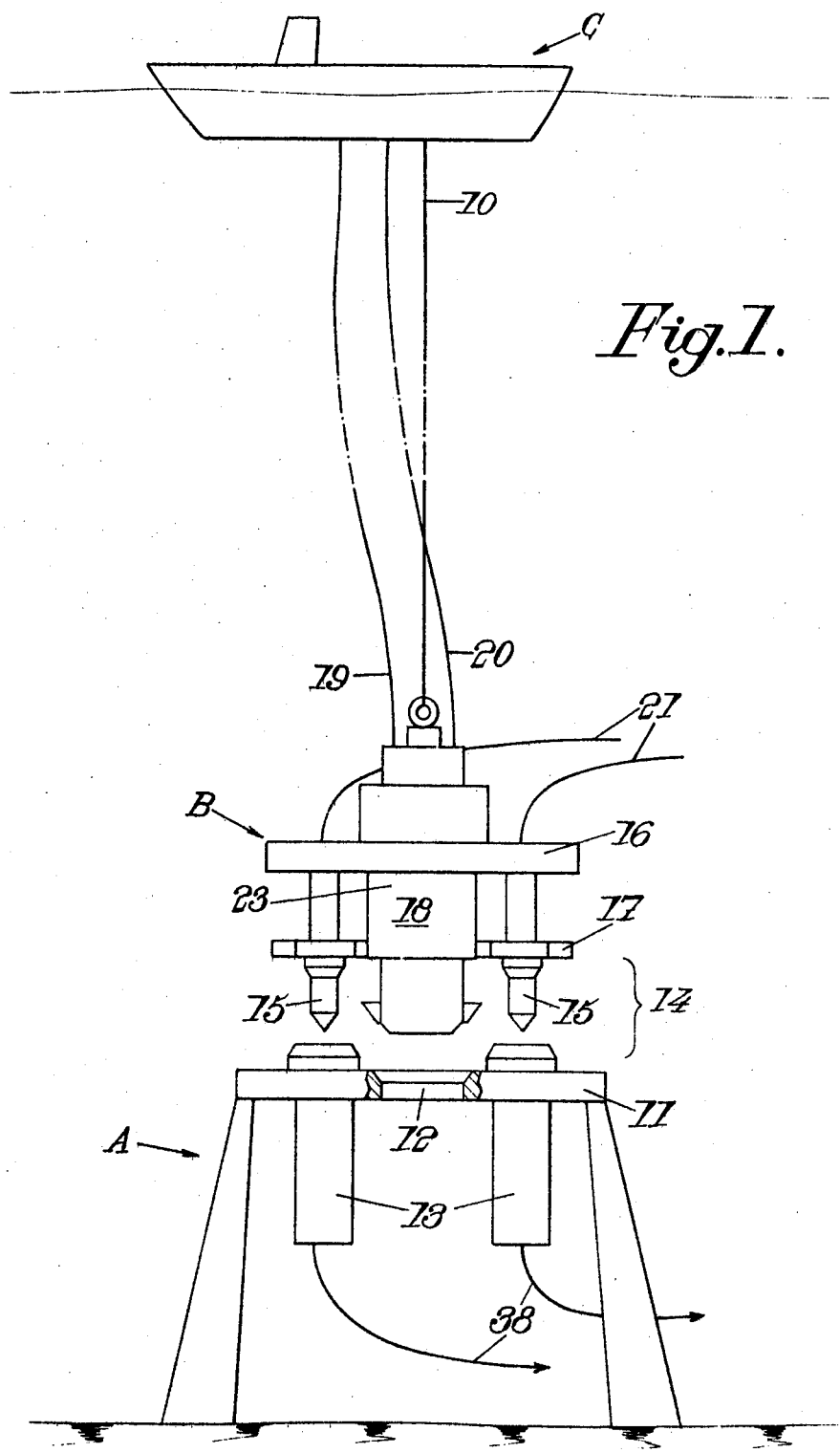
FIG. 1 is a simplified side elevation, showing a stationary structure on the sea bottom and a module or pod adapted for coupling to the stationary structure, the pod being shown during the approach and suspended by a cable from a service vessel.

Referring to FIG. 1, there is shown a stationary structure A on the sea bottom, often at a depth of several thousand meters, and a module or pod B suspended by a cable 10 from a surface barge or vessel C and adapted for coupling to structure A. Structure A is anchored on the sea bottom. It may inter alia be a sub-sea well head provided with a closed or open-circuit hydraulic power unit controlled or energized from the surface, motors (e.g. for operating sluice gates) to be electrically supplied and operated by AC or DC power from the vessel, as well as monitoring or measuring means providing analog or digital signals for transmission to the surface. The stationary structure comprises a pedestal or the like and a platform 11, formed with an opening 12 for receiving a device 18 for centering and locking the pod B. A plurality of openings 12 can be formed for cooperation with an equal number of centering and locking devices 18.

Platform 11 bears the female parts 13 of connectors 14 whose mating male parts 15 are borne by pod B. While hydraulic connectors 14 only are shown in FIG. 1, electric connectors or even connectors for optical fibers may also be provided, as will be shown later. Pod B comprises an upper plate 16 suspended from cable 10 and a lower plate 17 which can reciprocate vertically with respect to plate 16. When the pod is suspended, the weight of plate 17 tends to hold it in a lower position determined by the centering and locking device 18, as will be seen hereinafter.

Module B is suspended from vessel C by cable 10 and connected to the vessel by hydraulic flexible lines 19, 20 for controlling unlocking and locking. Hydraulic ducts and electric cables terminate into connecting elements carried by the part for connection with the stationary structure. In FIG. 1, the ducts and cables are represented by two lines 21 which can be connected either to vessel C (particularly if an open circuit, e.g. using soluble oil, is used for actuation) or to a submerged control system (if a closed-circuit hydraulic station is used).

Figure 2:
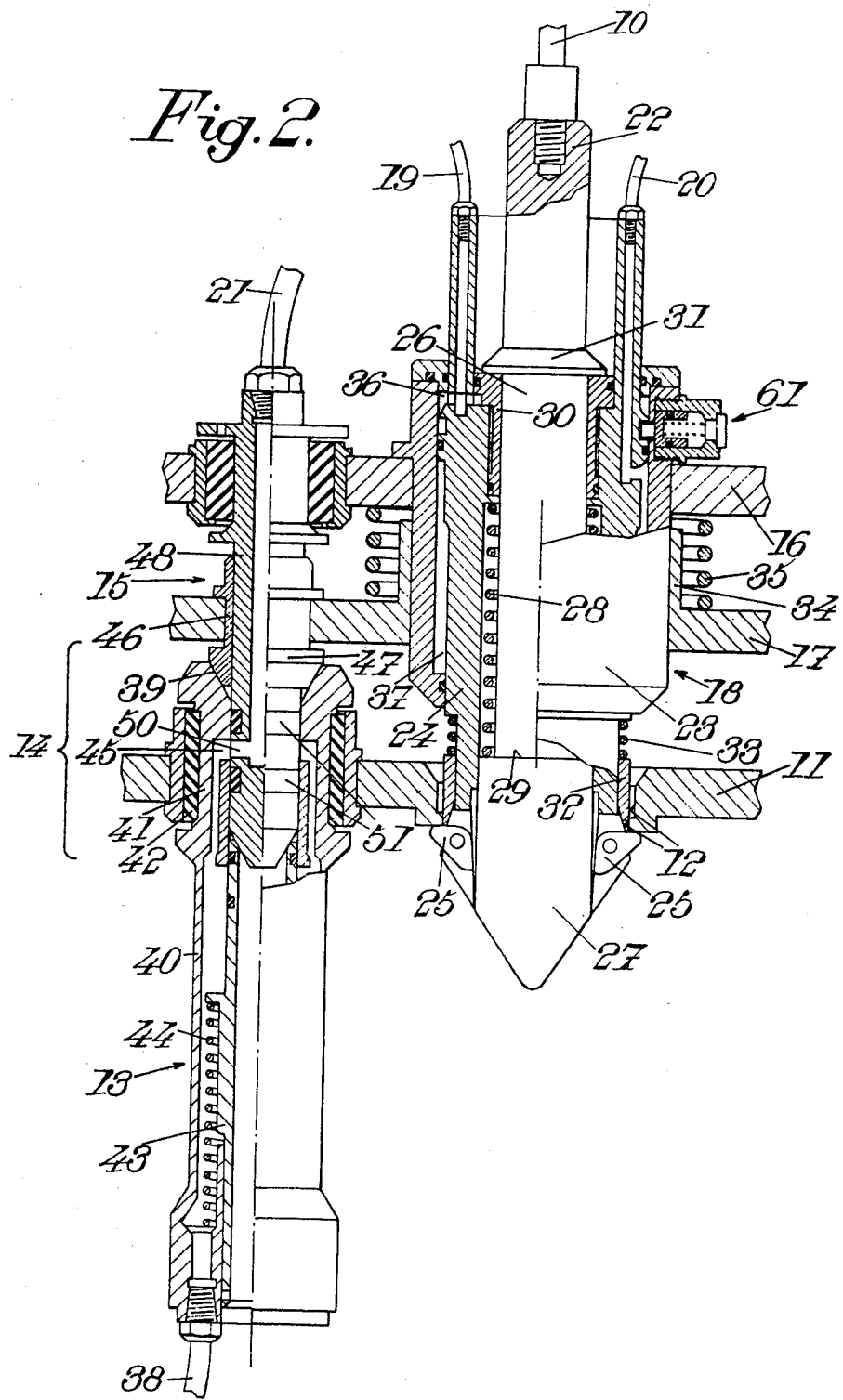
FIG. 2 is a detailed view, partly in vertical section, of part of the pod and of the stationary structure of FIG. 1, the components being shown in the position after complete coupling.

The pod is provided with a motion, approach and monitoring system (not shown) which can be of any conventional kind and may be equipped with television or ultrasonic imaging and display means. Referring to FIG. 2, the centering and locking device 18 comprises a cylinder 23 secured to upper plate 16 and formed with a head 22 for connecting cable 10 and flexible lines 19, 20. A tubular piston 24 is slidably sealingly received in cylinder 23 and projects downwardly therefrom. Locking lugs 25 are mounted for rotation about horizontal pins in radial slots formed in the piston from the lower end surface thereof. A plunger 26 terminating in a pointed nose 27 is mounted in a central bore of piston 24. A coil spring 28 is placed under compression between an inner flange of piston 24 and a shoulder 29 at the rear of nose 27. The spring 28 urges plunger 26 toward the position shown in FIG. 2, in which a downwardly directed shoulder of sleeve 30 abuts the top end of piston 24.

A push ring 32 provided with a return spring 33 tends to rotate the locking lugs 25. The amount of rotation is limited: the lugs 25 come against nose 27 when no pressure prevails in cylinder 18. Push ring 32 can be forced back so that the lugs 25 can tilt in the opposite direction so as to move through hole 12, as will be seen hereinafter.

Cylinder 23 is secured to the upper plate 16 of the pod and is slidably received in a sleeve 34 secured to the lower plate 17. A return spring 35 tends to spread plates 16 and 17 apart. Movement of the plates toward each other is limited by abutment of piston 24 and cylinder 23. The action of spring 35 is added to the weight of the bottom plate 17, the downward movement of which is limited by an end of travel abutment (not shown) on cylinder 23.

Piston 24 separates a top chamber 36 and a bottom chamber 37 in cylinder 23. Chambers 36, 27 are in communication with lines 19, 20 respectively. The hydraulic-fluid connector 14 which is shown in mating condition in FIG. 2 and is diagrammatically represented in FIGS. 3 and 4, is for connection between a line 21 and a duct 38 connecting the female part 13 of the connector to a hydraulic component carried by the platform and which is to be controlled or actuated.

The female part 13 has a bearing member 40 comprising a tubular body provided at its top end with a frustoconical portion 39. The body is secured to plate 11 by connecting means which leave bearing member 40 free to move angularly by a limited extend during coupling to compensate any defective alignment of the male and female parts. In FIG. 2, the connecting means are schematically illustrated as comprising a rigid collar 41 and an elastomer sleeve 42. Any other system providing sufficient angular clearance would be acceptable.

A tubular bush 43 or dummy piston is slidably mounted in body 40. A return spring 44 tends to return bush 43 to an extended position (FIG. 3) where it covers the mouth of the radially directed port terminal of a port formed in body 40. On the other hand, bush 43 can be moved downwards by compressing spring 44, for a sufficient distance to uncover mouth 45. O-ring seals are mounted in grooves formed in the inner wall of bush 43 and straddle mouth 45 when the bush 43 is in its extended or upper position (FIG. 3). The hydraulic fluid trapped in the hydraulic system of the platform is separated from sea water when the pod is disconnected from the platform. The bush also protects against fouling that region of the connecting element into which mouth 45 opens when the pod is disconnected.

The male part of connector 14 likewise comprises a bearing member 46 formed with a central bore parallel to the engagement direction. The lower end face of member 46 is adapted to contact portion 39 and to provide a sealing action. End face 47 may inter alia be conical or part spherical. Member 46 is secured to the lower plate 11 and has a slight clearance. A plunger 48 is slidably received in the bore of member 46 and is secured to plate 16 by a device which leaves it a limited freedom of angular movement. That device may be similar to that used for securing the female part of the connector to the platform.

Plunger 48 has a central port 49 connected at one end to line 21 and at the other end to the side surface of the plunger via one or more radially directed port terminals terminating in a mouth 50. Mouth 50 is straddled by two annular seals 51. As long as the pod is suspended from cable 10 and plate 17 is consequently in its lower position, member 46 covers mouth 50 (forming a connecting element), covers the annular seals 51 and protects them against sea water.

Figure 6:
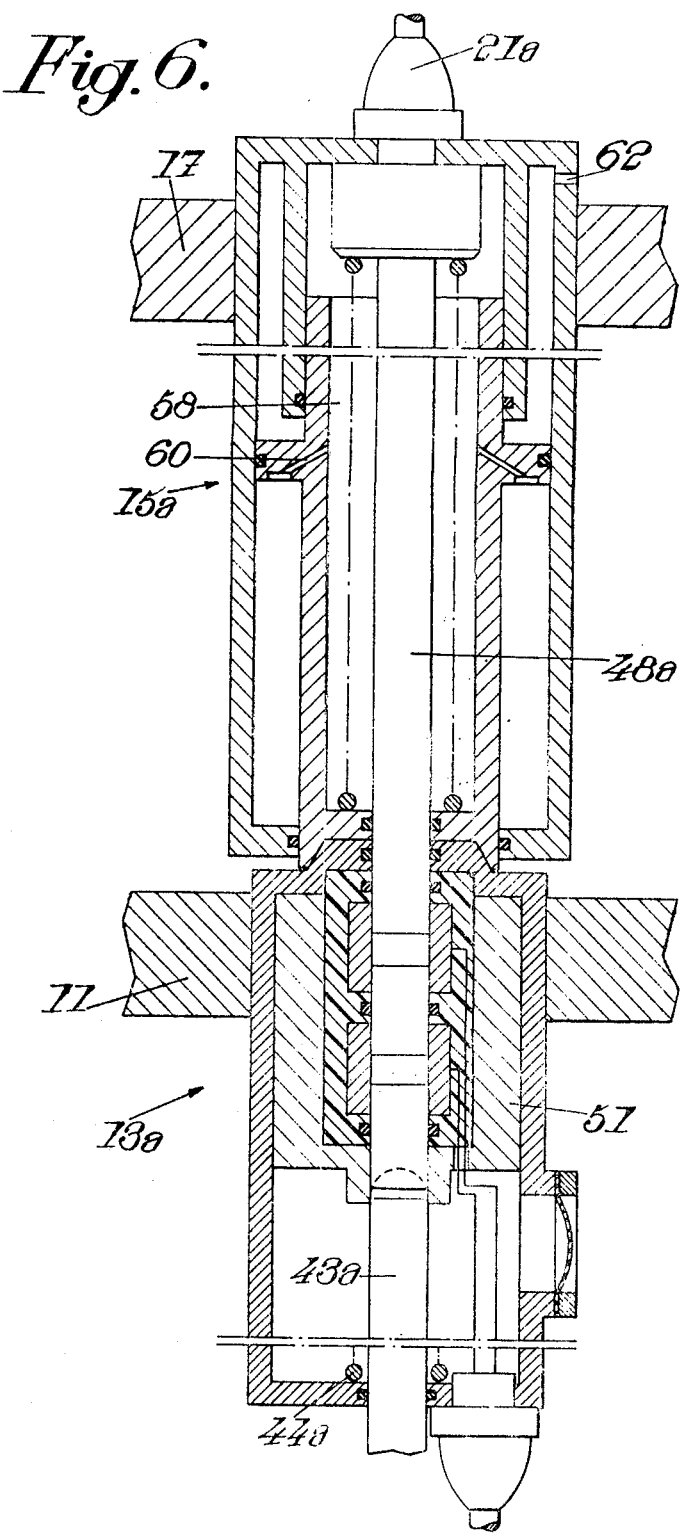

Referring to FIGS. 5 and 6, an electric connector is schematically illustrated whose general structure is comparable with that of the hydraulic-fluid connector shown in FIGS. 2-4. For this reason, those components of the connector in FIGS. 5 and 6 which correspond to those already described will be designated by the same reference numbers plus the index letter a.

The female part 13a has a bearing member 40a formed with a frusto-conical or spherical cap-shaped end face 39a.

In the male part, the connecting elements consist of electrically conductive annular areas 50a e.g. of gilded copper, deposited on plunger 48a, which is made of electrically insultating material, e.g. PTFE. In the female part, the connecting elements are annular electric contacts 45a mounted in an insulating tubular casing 52 clamped between the tubular member 40a and a metal ring 51 secured to bearing member 40a.

In order to prevent a conductive film of sea water from forming between the contacts and causing corrosion, the female portion 13a comprises:

sealing O-ring seals 53, on which bush 43a can slide, provided between contacts 45a and on both sides thereof 45a (bush 43a typically consisting of a dummy piston biased upwardly by a return spring 44a);

a chamber 54 containing an insulating protective hydraulic fluid (dielectric oil for instance) and formed between body 40a and ring 51, a deformable diaphragm 55 being provided between the chamber and sea water for balancing the pressures and also for obviating the effects of temperature variations.

Similarly, the male part 15a comprises:

O-ring seals 57 located in grooves of the bearing member 46a and of a cylinder 56 in which member 46a is slidably received, one seal preventing water leakage along the clearance between plunger 48a and member 46a and the other seal preventing water entering between member 46a and the cylinder; and a chamber 48, containing hydraulic fluid, formed between member 46a and the end of cylinder 56.

Except when the connector is mated, member 46a is returned by a return spring 61 to an extended or protruded position (FIG. 5) in which contacts 50a are immersed in the hydraulic fluid.

It will be appreciated that the volume of chamber 58 decreases when member 46a moves from its extended position. Oil is then forced out of the chamber. It is collected in an outer annular chamber 59 formed between a cylinder 56 and a bulged portion of member 49a. Chamber 59 is connected by ports 60 to the inner chamber 58. The cross-sectional area of chamber 59 is so selected that any variation in its volume due to axial movement of member 26a compensates the variations in the volume of chamber 58. Last, a supplemental compensation is provided by a variable-volume annular chamber 61 communicating with the environment through holes 62.

In order to facilitate centering and avoid the effects of deposits, plungers 43a and 48a advantageously have complementary shapes, half-spherical in the embodiment illustrated in FIGS. 5 and 6.

Since the operation of the device is clear from the description of the various components, it will be only briefly described.

As long as pod B is separated from structure A and is suspended from cable 10 (FIG. 1), the various components are in the positions illustrated in FIGS. 3 and 5. All connecting elements are protected, since they are covered by associated components and are straddled by seals.

For connection, the pod is lowered while properly positioned above the stationary structure A. Position control can be maintained by providing cooperating sliding means on pod B and platform A.

The successive movements produced in the centering and locking device 18, the hydraulic-fluid connectors 15 and the electric connectors will now be described.

The nose 27 of plunger first comes in contact with plate 11. The locks 25 rotate under the action of push ring 32, until they can enter opening 12. When they have come past the opening, they return to the locked position, under pressure from ring 32. Device 18 is then locked. The bearing members 46 of the male parts of the connectors contact the corresponding bearing members 40 while the upper plate 16 moves down relative to the bottom plate 17 and compresses spring 35 by its weight. Next, oil under pressure is introduced into the lower chamber 37 via line 20. The oil pressure in chamber 37 subjects cylinder 23 to a force which adds to the weight of plate 16 and forces it down and simultaneously urges piston 24 upwardly. A resilient lock 61 may be provided for securing cylinder 53 relative to piston 24 in the relative position in which they are brought by the oil pressure in chamber 37. The compartment of hydraulic lock 61 is connected to the flexible line 20 by a duct (not shown).

The male and female parts of the hydraulic-fluid connectors 14 successively take up the positions shown in FIG. 3 (before contact), then FIG. 4 (during coupling) and FIG. 2 (after coupling). The connecting elements are protected from sea water by seals, which surround them both before and after coupling. It is only during the actual mating step that a film of sea water can fill the narrow annular gap between the coupling elements of plunger 48 and the coupling elements of the bearing member 40.

As long as the female part 13 is unmated, it is not formed with any blind holes which can be blocked up by sediment: sediment can flow along a central through aperture.

During coupling, the bearing members 46a, 39a and plungers 48a, 43a come into contact almost simultaneously. Member 46a and plunger 43a (which may have a metal core to increase its rigidity) are forced into retracted condition, compressing the associated return springs 61 and 44a. Both before (FIG. 5) and after (FIG. 6) the coupling operation, the electric contacts are protected from sea water by the O-rings 53 or 57, by the film of oil extending from chamber 54, and by the oil coming from chamber 54 or chamber 58.

For disconnecting and lifting pod B, a lifting force is exerted on cable 11 and simultaneously send oil under pressure via flexible line 19. The oil subjects cylinder 23 to force which forces it upwardly with respect to piston 24. The oil also forces back the lock 61. Cylinder 23 rises along with head 22 and plunger 26. When cylinder 37 has completed its travel, sleeve 30 (on which the pressure from flexible line 19 has a smaller effective area than on cylinder 23) raises and draws plunger 26. As soon as the locking lugs 25 confront nose 27, they rotate and thus release device 18, whereupon the pod can be raised. During the disconnection, the connectors make the opposite movements from those described during connection.

It may happen that means 61 and/or members 23, 24 lock or jam after a prolonged period of time in water. Even so, if the device illustrated in FIG. 2 is used, the pod B may still be removed by exerting increased tension on cable 10. As a result of the tensile force exerted on the cable, plunger 26 rises and compresses spring 28 which is adapted to yield if the force exceeds a predetermined value (typically 2–5 tons). As soon as nose 27 comes opposite the rotatable locks 25, they can tilt and release device 18.

Numerous variations of the embodiments of the invention, both with regard to the materials of which the various parts are made (usually stainless steel and marine bronze for the structural components and PTFE for the sealing members). If the pod is sufficiently heavy, it may be unnecessary to use a locking mechanism with attendant simplification of the construction and operation.

We claim:

1. An underwater connector for use in a deep water environment and the like, comprising a female part, a male part and means for moving said male part and female part toward and away from each other, in an engagement direction, wherein:

said female part comprises a bearing member having at least one passage parallel to the direction of movement, at least one female connecting element located in said passage and having a bearing end portion, a water-tight sealing bush rectilinearly movable inside said passage in the bearing member between a protruded position and where it covers said connecting element, and a retracted position where it uncovers the elements and return spring means biasing said bush toward said protruded position, said bush and said bearing member limiting a space filled by a hydraulic fluid protecting said connecting elements;

said male part comprises a bearing member formed with at least one passage parallel to said direction of movement, said bearing member having an end part arranged for substantially sealing-tight contact against said bearing portion and for centering the male and female parts relative to one another, a plunger in said passage of said bearing member, at least one connecting element formed in the side wall of said plunger for cooperation with the connecting element of the female part, said bearing member of said male part being movable with respect to said plunger between a protruded position in which it bounds a chamber locating a hydraulic fluid protecting the connecting element and a retracted position in which the contact elements project from the bearing member, and return spring means urging said bearing member toward said protruded position, and said moving means are arranged to move the bearing member of the female part and the plunger of the male part towards one another and to compress said return spring means until the connection is made, and to retain the male and female parts in connected condition.

2. A connector according to claim 1, wherein the bearing member of the female part is carried by a stationary submerged platform whereas the male part is carried by a connecting pod comprising a top plate, to which the plunger of the male part is connected, and a bottom plate, to which the bearing member of the male part is secured, said return spring means of the male part tending to push the plates apart and said top plate being suspended from a bearing cable.

3. An electric connector according to claim 2, wherein the bushing means consists of a second plunger of electrically insulating material, having a diameter substantially equal to that of the plunger of the male part, slidably mounted in said bearing member of the female part and wherein the connecting element of the second plunger comprises annular electric contacts.

4. An electric connector according to claim 2, wherein the bearing member of the male part is slidably received in a cylinder secured to said upper plate, said bearing member and said cylinder limiting an inner chamber in which the connecting elements of the male part are immersed when the bearing member is in extended position, said bearing member slidably projecting into an annular outer chamber communicating with the inner chamber and said chambers being so dimensioned relative to each other that any variation in volume of the outer chamber, compensates those of the inner chamber when the bearing member moves in the cylinder.

5. A hydraulic-fluid connector according to claim 1, wherein the connecting element of the female part comprises radially directed port terminal into the passage via a mouth which is covered by the bush when the latter is released, whereas the plunger of the male part has a central port which opens on to the side wall of the plunger via a port terminal which, upon coupling, comes in registry with the mouth of the port of the stationary part, said mouths being straddled by seals.

* * * * *